Jan. 25, 1949.  W. D. CURTEMAN  2,459,925
IMPRESSION INSTRUMENT
Filed Oct. 31, 1945  2 Sheets-Sheet 1
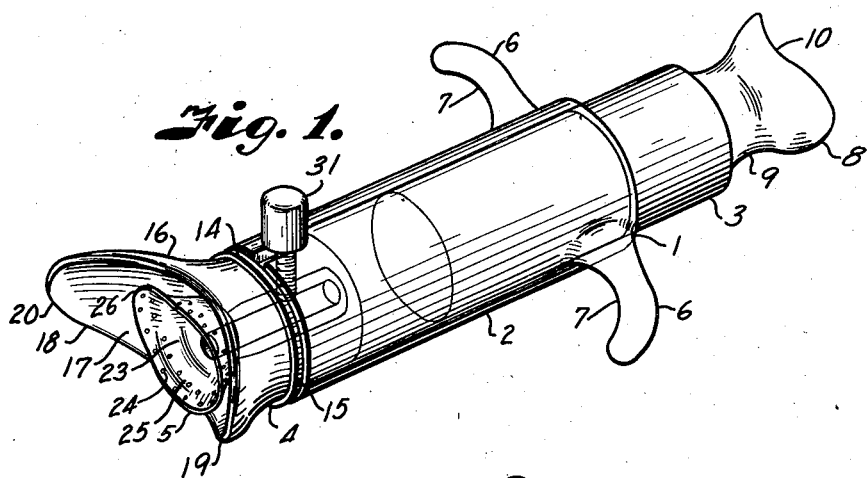
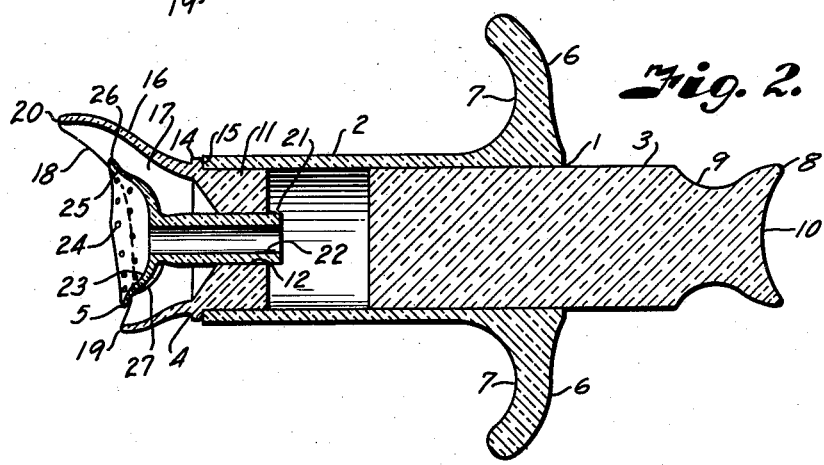
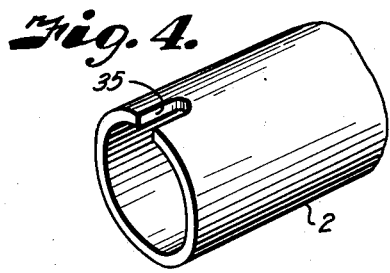
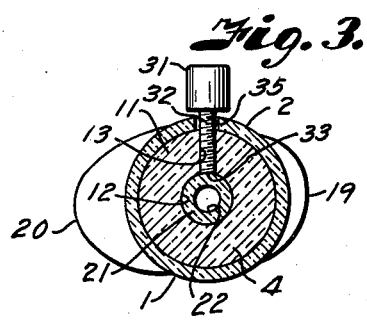
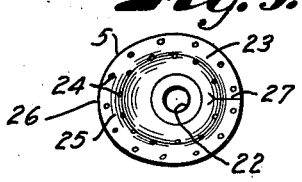
INVENTOR
Wallas D. Curteman
BY
Fishburn&Mullendore.
ATTORNEYS Jan. 25, 1949.  W. D. CURTEMAN  2,459,925
IMPRESSION INSTRUMENT
Filed Oct. 31, 1945  2 Sheets-Sheet 2

INVENTOR
Wallas D. Curteman
BY
Fishburn & Mullendore
ATTORNEYS.

Patented Jan. 25, 1949

2,459,925

UNITED STATES PATENT OFFICE 2,459,925

IMPRESSION INSTRUMENT

Wallas D. Curteman, Kansas City, Mo.

Application October 31, 1945, Serial No. 625,830

5 Claims. (Cl. 18—5.1)

This invention relates to an impression instrument, and more particularly to an injection type instrument for taking the impression of an eye for contact lenses. The device is also adapted for taking impressions of the orbital cavity for artificial eyes.

In the manufacture of contact lens it is necessary, due to differences in facial structure of the user as well as the eye itself, to take an impression of the eye and surrounding tissue so that the lens may fit the individual user and eliminate discomfort during use of the lens.

The principal objects of the present invention are to provide an impression instrument which will give an exact impression of the eye and surrounding tissue of the patient preparatory to making contact lens therefor; to provide a device having a cup-like portion or tray adapted to fit under the eyelids to act as a form to hold the impression material while setting to the contour of the eye and surrounding tissue; to provide perforations in the tray portion in which the impression material may form to hold the impression therein for removal from the eye; to provide a device having a cup portion adapted to fit around the eye socket to prevent the impression material which may escape around the tray portion from flowing down the face of the person and the cup forming a support for taking the pressure of the injection forces instead of such forces being applied against the eye while the impression is being taken; to provide means for injection of the impression material to the perforated tray member; to provide means for rigidly holding the perforated tray member to the body of the device; and to provide a device of this character simple, economical to manufacture and efficient in operation.

In accomplishing these and other objects of the invention, I have provided improved details of structure, the preferred form of which is illustrated in the accompanying drawings wherein:

Fig. 1 is a perspective view of an impression instrument embodying the features of my invention.

Fig. 2 is a cross section of the instrument.

Fig. 3 is a transverse cross section particularly illustrating the set screw for contacting the tube on the cup-like member and holding the cup-like member rigidly to the body of the instrument.

Fig. 4 is a perspective view of the end of the tubular body particularly illustrating the slot in the end for slidably receiving the stem of the set screw for holding the parts together as shown in Fig. 3.

Fig. 5 is a plan view of the perforated cup-like member for contacting the eye.

Figure 6:
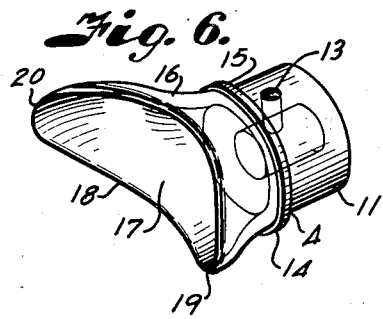
Fig. 6 is a perspective view of the tray member for contacting the facial contour around the eye.

Referring more in detail to the drawings:

1 designates an impression instrument embodying the features of my invention comprising a tubular body 2, a plunger 3 adapted to fit in the tubular body, a head 4 removably secured in one end of the body member, and an impression tray member 5 removably secured in the head 4.

The tubular body 2 is provided near one end thereof with outwardly extending arms 6 curved slightly to form finger holds as indicated at 7 (Fig. 1). The plunger 3 is an elongated solid body adapted to engage in the tubular body to provide a snug fit. The outer end thereof may be provided with a head 8 of any desirable form. I have here illustrated the plunger 3 to be reduced as indicated at 9 (Fig. 2), then having an enlarged portion to form the head 8. The outer end may be dished as indicated at 10 to provide a thumb portion for the operator when the device is in use. The body member and plunger or piston are so devised that the first and second fingers of the hands of the operator may engage the arm 6 and the thumb engage the head of the plunger as indicated at 10 so that pressure applied on the thumb against pressure applied by the fingers will insert the piston in the tubular body. The body and plunger may be made of any desirable material but I preferably use plastic, glass or some other like material, although I do not wish to be limited to any particular material.

The head 4 has a shank 11 adapted to fit in the end of the tubular body member opposite the plunger and is centrally bored as indicated at 12 (Fig. 6). The shank 11 is also provided with a transverse bore 13 intersecting with the bore 12 for a purpose later described. The head has an annular flange 14 around its outer periphery providing a shoulder 15 against which the end of the tubular body will abut when the stem is inserted therein as best illustrated in Fig. 2. The head also has a cup member 16 forming a chamber 17 in the outer end of the head. The sides of the cup are curved as indicated at 18 (Fig. 6), and the ends opposite such curved portions are elongated forming ends 19 and 20. It will be noted that the end 20 of the cup is longer than the end 19 to adapt the cup to fit the contour of the face around the eye socket. The shorter edge of the cup contacts the portion of the face around the eye next to the nose, the longer edge 20 contacting the face at the outer portion of the eye socket, thus conforming to the contour of the face around the eye socket or orifice and forming a support for the device to take the force of pressure on the tube when the impression material is inserted in the eye socket.

The tray member 5 is provided with a stem 21 and is centrally bored as indicated at 22. The stem is of a size to extend snugly through the opening 12 in the stem 11 of the head 4. The bowl portion 23 of the tray is provided with a plurality of perforations 24 for a purpose later described. The bowl 23 is flared slightly outwardly near its outer rim as indicated at 25 (Fig. 2) and the side 2 is slightly longer than the opposite side and in operation of the device this elongated portion 26 is placed to the outside of the eye and the shorter portion to the nasal side of the eye. The tray is preferably provided on the short side of the bowl with a rib 27 to indicate that this side should be inserted at the nasal side of the eye.

Figure 7:
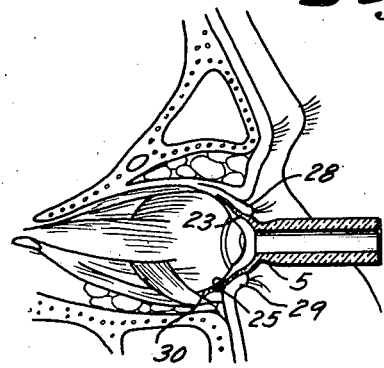
Fig. 7 is a cross section of the perforated cup member showing the tube thereon and the cup contacting the eye.
Figure 8:
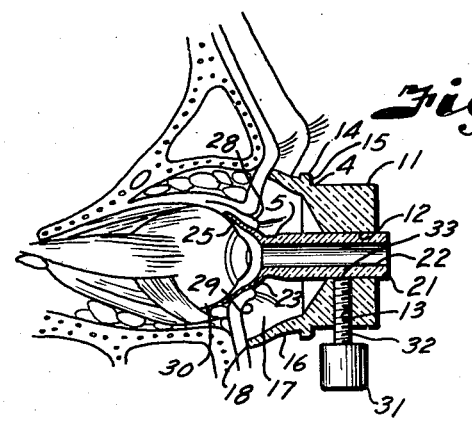
Fig. 8 is a cross section of the perforated cup member and tube shown in engagement with the tray shown in Fig. 6.
Figure 9:
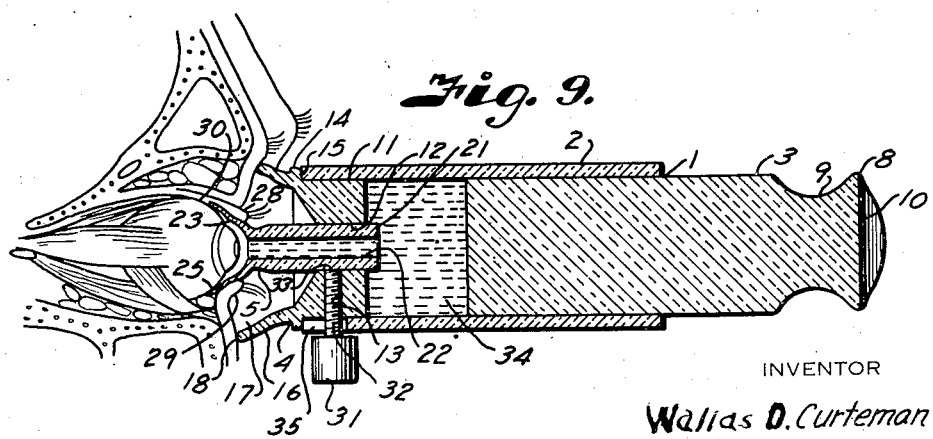
Fig. 9 is a cross section of the instrument applied to the eye ready for taking an impression.

In operation of a device assembled and constructed as described, the eye is usually thoroughly anesthetized with a suitable solution, such as a five per cent solution of pontocaine hydrochloride. The shell-like tray 5 is placed under the upper eyelid 28 and lower eyelid 29 as best illustrated in Fig. 7, the long side 26 being to the outer side of the face as above stated, so that the inside of the tray will fit snugly against the eye 30. The cup 16 of the head 4 is then inserted over the stem 21 of the cup so that the stem engages in the bore opening 12 of the stem 11 of the head. The longer edge 20 of the cup of the head is placed to the outer side of the face and the cup pressed firmly against the contour of the face. The upper edge of the cup will engage just under the eyebrow of the patient and the lower edge high upon the cheekbone, as illustrated in Figs. 8 and 9. When the cup and tray are thus inserted in the positions as above described, a set screw 31 having a threaded shank 32 is engaged in the transverse opening in the stem 11 of the head 4 so that its inner end will engage the tubular stem 21 of the tray member as indicated at 33 (Fig. 8) to hold the cup and head members in rigid relation. A quantity of impression material is then placed in the tubular body member 2 as indicated at 34 (Fig. 9) and the tubular body member inserted over the stem 11 of the head so that the end thereof will come to rest against the shoulder 15 of the head member. The end of the tubular body extending over the stem of the head is provided with a slot 35 through which the shank 32 of the set screw 31 is adapted to engage and the set screw then turned to engage the wall of the tubular member to hold it rigidly to the head.

The impression material is usually an alginate type. While I do not wish to be limited to any particular kind of impression material, I have found the alginate impression material to be very acceptable in taking impressions of the human eye. The impression material is mixed to a consistency somewhat thinner than that used for dental purposes, the material being spatulated for approximately one minute and the temperature of the water being approximately 70° to 80° F. After the material is placed in the tubular body of the syringe, it may be forced about one-half of the way down by the pressure of the plunger before fitting of the tubular body on the head as above set forth. When the pressure is released from the cup portion of the head, the perforated tray will be pulled slightly away from the eyeball, i. e., approximately 2 mm. The device is then ready for injection of the impression material. The patient is then instructed to look straight ahead and the plunger is slowly pushed forward in the tubular body. The perforated tray being slightly pulled away from the eyeball will allow even flow of the impression material over the entire area of the outer portion of the eye.

All parts of the device, and particularly the tray and cup member, are made of transparent material so that the impression material may be observed on its way through the device. The material will be forced through the opening 21 in the stem of the tray member and will cover the area desired and some of the material extend into the perforations 24 of the cup. When the material has completely covered the area desired, the patient's upper and lower lids will appear slightly bulged. The device is not removed until the material has set sufficiently to retain its shape. The material setting in the perforations of the cup will cause the impression to adhere to the cup so that it may be removed without danger of breaking.

It will be obvious from the foregoing that my improved impression instrument may be utilized for taking an impression of the eye socket and surrounding tissue where the eye has been entirely removed, and particularly for substituting a prosthesis or artificial eye, the tray member being inserted under the eyelid and the cup adapted to the facial contour of the patient the same as for taking an impression for contact lens, the only difference being in the amount of alginate impression material required to fill the orbital cavity and anesthetizing of the cavity before taking the impression.

It will be obvious from the foregoing that I have provided an improved impression instrument for taking the impression of the eyeball or orbital cavity which may be inserted under the eyelid of the patient by applying very little pressure against the eye, thus aiding in the patient's comfort during the taking of the impression.

What I claim and desire to secure by Letters Patent is:

1. An impression instrument comprising, a tubular body, a plunger mounted to reciprocate in said body, a head adapted to engage in one end of said body, said head having a bore extending centrally thereof, a perforated tray member having a tubular stem engaging in said bore in said head, said tray member being shaped to fit the eyeball and surrounding tissue, means for holding said head and cup member in rigid position, and a cup-like member on the outer end of the head adapted to engage against the face of the patient around the eye orifice while the impression is being taken.

2. An instrument for taking the impression of the eye of a patient comprising, a tubular body for containing an impression material, a head having a stem adapted to engage in one end of said body and having a cup-like member on its outer end adapted to fit the facial contour of the patient around the eye orifice, said stem being centrally bored, a plunger mounted to reciprocate in said body, and a tray member having a tubular stem engaging in the bore in said stem on said head providing a passageway to the tubular body whereby the impression material will be forced to said tray member upon inward movement of the plunger in said tubular body.

3. An instrument for taking the impression of the eye of a patient comprising, a tubular body for containing an impression material, a head having a stem adapted to engage in one end of said body and having a cup member on its outer end adapted to fit the facial contour of the patient around the eye socket, said stem being centrally bored, a plunger mounted to reciprocate in said body, a tray having a tubular stem engaging in the bore in said stem on said head providing a passageway to the tubular body whereby the impression material will be forced to said tray upon inward movement of the plunger in said tubular body, said cup member being adapted to engage under the eyelids of the patient, and means carried by said head and engaging the tubular body and the stem of said tray for holding the same in rigid position.

4. An instrument for taking the impression of the eye of a patient comprising, a tubular body for containing an impression material, a head having a centrally bored stem adapted to engage in one end of said body and having a cup-like member on its outer end adapted to fit the facial contour of the patient around the eye socket, a plunger mounted to reciprocate in said body, a perforated tray member having a tubular stem adjustably engageable in the bore in said stem on said head providing a passageway to the tubular body whereby the impression material will be forced to said tray member upon inward movement of the plunger in said tubular body, said stem of said head having a transverse bore connecting with the central bore, the end of said body engaging said stem having a slot, and a set screw adapted to engage in said slot and the transverse bore and having its inner end engaging the tubular stem of the cup member for holding the body, head and cup member in rigid relation.

5. An impression instrument comprising a tubular body, a plunger mounted to reciprocate in said body, a removable head adapted to engage in one end of said body, said head having a bore extending centrally thereof and having its outer end flared outwardly adapted to fit the facial contour of a patient around the eye orifice, a perforated tray member having a tubular stem adjustably engageable in said bore in said head, said tray member being shaped to fit the eyeball and surrounding tissue under the eyelids to hold the lids extended to normal position, and means for holding said head and cup member rigidly on said body.

WALLAS D. CURTEMAN.

REFERENCES CITED

The following references are of record in the file of this patent:

UNITED STATES PATENTS

| Number | Name | Date |
| --- | --- | --- |
| 1,561,052 | Brown | Nov. 10, 1925 |
| 1,812,008 | Lace | June 30, 1931 |
| 2,315,748 | Thompson | Apr. 6, 1943 |
| 2,370,389 | Bessin et al. | Feb. 27, 1945 |